United States Patent [19]
Henrion et al.

[11] Patent Number: 5,652,384
[45] Date of Patent: Jul. 29, 1997

[54] SENSOR STRUCTURE WITH L-SHAPED SPRING LEGS

[75] Inventors: W. S. Henrion, Austin; Raymond K. Erickson, Taylor; Hubert R. Plumlee, Plano; Matthew W. Ip, Austin, all of Tex.

[73] Assignee: I/O Sensors, Inc., Austin, Tex.

[21] Appl. No.: 635,039

[22] Filed: Apr. 17, 1996

Related U.S. Application Data

[63] Continuation of Ser. No. 218,525, Mar. 28, 1994, abandoned.

[51] Int. Cl.[6] .................................................. G01P 15/00
[52] U.S. Cl. ..................... 73/514.24; 73/514.18; 73/514.38
[58] Field of Search ..................... 73/514.18, 514.32, 73/514.33, 514.34, 514.38, 514.36, 514.16, 514.24; 361/280, 283

[56] References Cited

U.S. PATENT DOCUMENTS

| | | | |
|---|---|---|---|
| 4,021,766 | 5/1977 | Aine | 29/580 |
| 4,071,838 | 1/1978 | Block | 73/517 R |
| 4,144,516 | 3/1979 | Aine | 29/580 |
| 4,553,436 | 11/1985 | Hansson | 73/517 R |
| 4,597,003 | 6/1986 | Aine et al. | 29/580 |
| 4,641,539 | 2/1987 | Vilimek | 73/517 R |
| 4,679,434 | 7/1987 | Stewart | 73/517 R |
| 4,922,756 | 5/1990 | Henrion | 73/517 R |
| 4,930,042 | 5/1990 | Wiegand et al. | 361/280 |
| 5,000,817 | 3/1991 | Aine | 73/517 R |
| 5,134,881 | 8/1992 | Henrion et al. | 73/517 R |
| 5,207,117 | 5/1993 | Bennett | 73/517 R |
| 5,261,277 | 11/1993 | Thomas et al. | 73/517 AV |

OTHER PUBLICATIONS

Proceedings of the IEEE, vol. 70, No. 5, May, 1982, Petersen, Kurt E., *Silicon as a Mechanical Material*.
Proceedings of the IEEE, vol. ED–25, No. 10, Oct. 1978; Bassous, Ernest; *Fabrication of Novel Three–Dimensional Microstructures by the Anisotropic Etching of (100) and (110) Silicon*.
Scientific American, April 1983; Angell, James B., Terry, Stephen C., and Barth, Phillip W., *Silicon Micromechanical Devices*.
IEEE Publication 0018–9383/79/1200–1911, 1979; Roylance, Lynn M. and Angell, James B., *A Batch–Fabricated Silicon Accelerometer*.
IEEE Publication CH278–9/90/0000–0153, 1990; Henrion, Wo, DiSanza, Len; Ip, Matthew; Terry, Stephen; & Jerman, Hall; *Micro–Machined Accelerometer*.

*Primary Examiner*—Hezron E. Williams
*Assistant Examiner*—Helen C. Kwok
*Attorney, Agent, or Firm*—Bush, Riddle & Jackson, L.L.P.

[57] ABSTRACT

A sensor structure (10) has a central mass (16) mounted within a support structure comprising an outer support frame (18), and upper and lower plates or covers (12, 14). Eight L-shaped ribbon springs (32, 34) fit about the corners (28) of the mass (16) to mount mass (16) for movement from a reference position with respect to the support structure. One leg (38) of each spring (32, 34) is connected to an associated side (26A) of the mass (16) centrally of the length of the associated side (26A). The other leg (40) is connected to the outer support frame (18). The sensor structure is designed for use as a sensing mechanism in an electrostatic accelerometer arrangement.

22 Claims, 3 Drawing Sheets

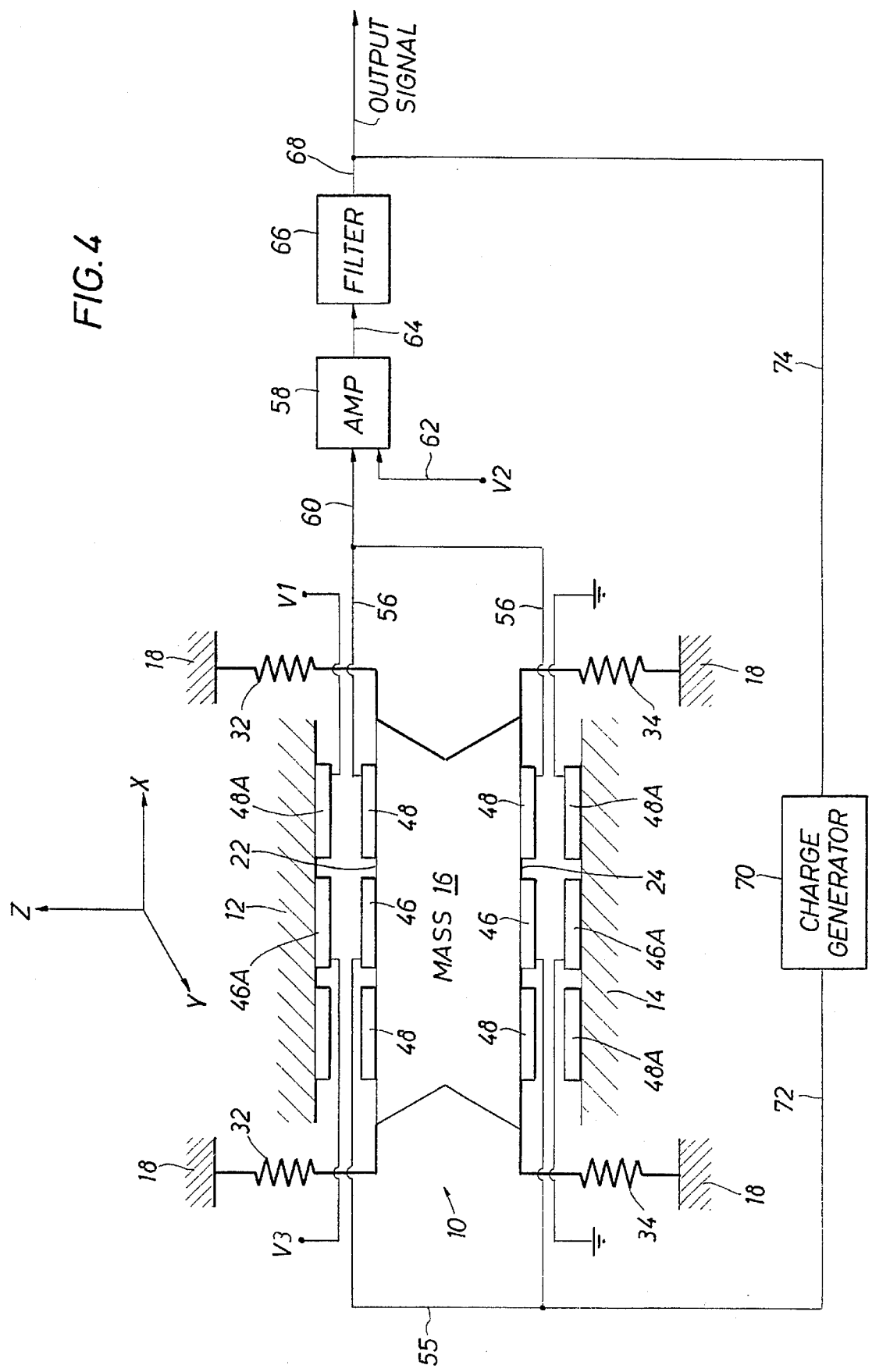

SENSOR STRUCTURE WITH L-SHAPED SPRING LEGS

This application is a continuation of application(s) Ser. No. 08/218,525, filed on Mar. 28, 1994, now abandoned.

BACKGROUND OF THE INVENTION

1. Field of the Invention

This invention relates generally to a spring-mass-support structure in which the mass is supported by springs where displacement of the spring supported mass may be sensed electrostatically or by other means to provide a signal proportional to a characteristic of motion such as position, velocity or acceleration applied to the support structure.

2. Description of the Prior Art

Heretofore, silicon accelerometers or sensing devices have been constructed with a spring supported mass in a support structure. For example, U.S. Pat. No. 4,922,756 dated May 8, 1990 to Henrion shows a silicon acceterometer in which a spring-mass-support sensing structure has a sensing mass supported from a support frame by a plurality of E-shaped leaf springs formed of silicon dioxide. Each of the leaf springs includes a base with two integral outer legs and an integral inner leg connected to the base. The inner leg is connected to the mass while the outer legs are connected to the support frame. Displacement of the mass applied to the support structure is measured by suitable electronic circuitry which may be arranged to provide an analog or binary representation of the acceleration or velocity applied to the support structure or of the position of such support structure.

U.S. Pat. No. 4,144,516 to Aine dated Mar. 13, 1979 discloses a dual leaf spring transducer in which a pair of E-shaped leaf springs are connected between a central mass and an outer support structure. The E-shaped leaf springs are mounted in mutually opposed relation so that the leaf spring structures are coupled together for deflection in unison relative to the surrounding support structures in response to deflection of the mass with respect to the support structure. A capacitive detector device is provided for detecting displacement of the mass.

U.S. Pat. No. 4,553,436 dated Nov. 19, 1985 to Hansson discloses a silicon accelerometer in which a central mass is connected at its corners by four thin, flexible spring legs secured to an outer support structure. The legs extend in a single direction parallel to the mass. Each leg has an end connected at right angles to a side of the mass adjacent a corner. The stationary ends of the legs or springs are connected to the support frame.

U.S. Pat. No. 4,641,539 dated Feb. 10, 1987 to Vilimek shows a mass (called a force takeup element) connected by four spring support legs to the support structure. The support legs extend in a direction parallel to the adjacent edge of the mass and have one end connected to the adjacent edge adjacent a corner of the mass. The other stationary end of each leg is connected to the support structure or body. The legs are thin leaf-spring like strips which deform upon displacement of the mass. The displacement of the mass is measured in a well known manner.

It is desired that spring members disposed between a mass and its adjacent support structure be highly insensitive to shock forces or impacts in directions orthogonal to the measurement axis of the mass and support structure and not buckle when lateral forces are applied to such support structure. However, many of the prior art frame-spring-mass configurations do not provide sufficient insensitivity to acceleration or angular motion which are in the plane of the mass, and the springs of such prior art configurations tend to buckle in response to lateral forces. Furthermore, it is desired that a frame-spring-mass system be extremely linear in its measurement of acceleration and be characterized by minimum stress on its springs where force is applied along its measurement axis. Many prior art frame-spring-mass designs do not provide sufficient linearity or minimization of spring stress in response to force applied to the measurement

IDENTIFICATION OF OBJECTS OF THE INVENTION

It is an object of this invention to provide a spring mass support structure intended for use with electrical circuitry to create a high sensitivity sensor for the measurement of acceleration, or velocity, etc., along a measurement axis and which has a very low distortion and has a very low cross axis sensitivity to acceleration and angular motion.

A further object of this invention is to provide a spring-mass-support structure in which spring legs support a proof mass with a high degree of mechanical symmetry and without any buckling of the legs during operation.

A still further object of this invention is to provide a spring-mass-support structure which produces a measurement of acceleration with high linearity with respect to acceleration applied along its measurement axis.

SUMMARY

The objects identified above as well as other features and advantages of this invention are incorporated in a device including a support structure having a center mass supported by spring members connected between the mass and the outer frame of the support structure about the mass. The spring members are thin flexible ribbon-like springs of an L-shape fitting in a space between the center mass and the outer frame. The term L-shape is sometimes referred to as elbow-shaped. Both terms L-shape and elbow-shape are intended to identify the shape of a spring having two legs, each of which is at right angles to the other leg with the legs not being of equal length. The inner mass is preferably of a generally rectangular shape, although it may be of other shapes, e.g., circular. The outer frame, which fits about the inner mass, is also preferably of a generally rectangular shape to receive in spaced relation the inner mass therein. The outer frame also may be of other shapes. The term generally rectangular shape is intended to describe the shape of the top and bottom surfaces, which may be rectangular or square in shape.

The L-shaped ribbon spring members are disposed in the space between the mass and outer frame. A pair of superjacent L-shaped spring members are mounted about each actual or virtual corner of the mass with one leg of each L-shaped spring member secured at its end to the mass centrally of the length of the adjacent edge of the mass. The other leg of each L-shaped spring member is secured at its end to the outer frame intermediate the length of the adjacent edge of the outer frame. As a result, eight L-shaped spring members are mounted about actual or virtual corners of the mass with one leg of each spring member being secured to the mass centrally of the length of the adjacent edge of the mass thereby providing mechanical symmetry to the mounting of the mass.

As a result of special characteristics of the L-shaped springs and their symmetrical mounting, the effects of off-axis forces which may be exerted against the mass are minimized. Such a spring mounting also minimizes buckling of any springs and permits the mass to withstand shocks over 1000 g in magnitude with minimal sensitivity. According to the invention, the L-shaped springs have long legs, as compared to prior spring-mass-support structures. Such long legs maximize linearity of the frame-spring-mass assembly for measurement of acceleration and other parameters.

BRIEF DESCRIPTION OF THE DRAWINGS

FIG. 4 is a schematic illustration of an illustrative feedback control system for detecting acceleration applied to the sensor structure of the invention.

DESCRIPTION OF THE INVENTION

Figure 1:
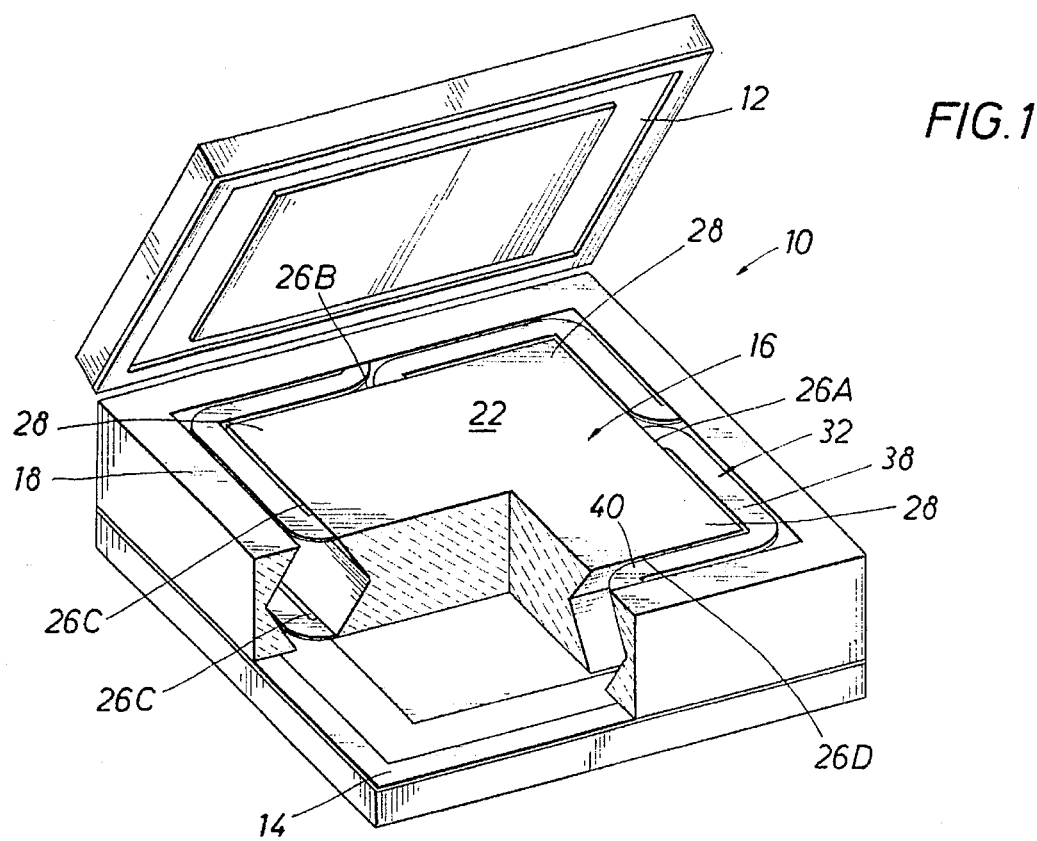
FIG. 1 is an exploded perspective view of the sensor structure forming the present invention and illustrating a spring mounted mass within an outer support frame.
Figure 2:
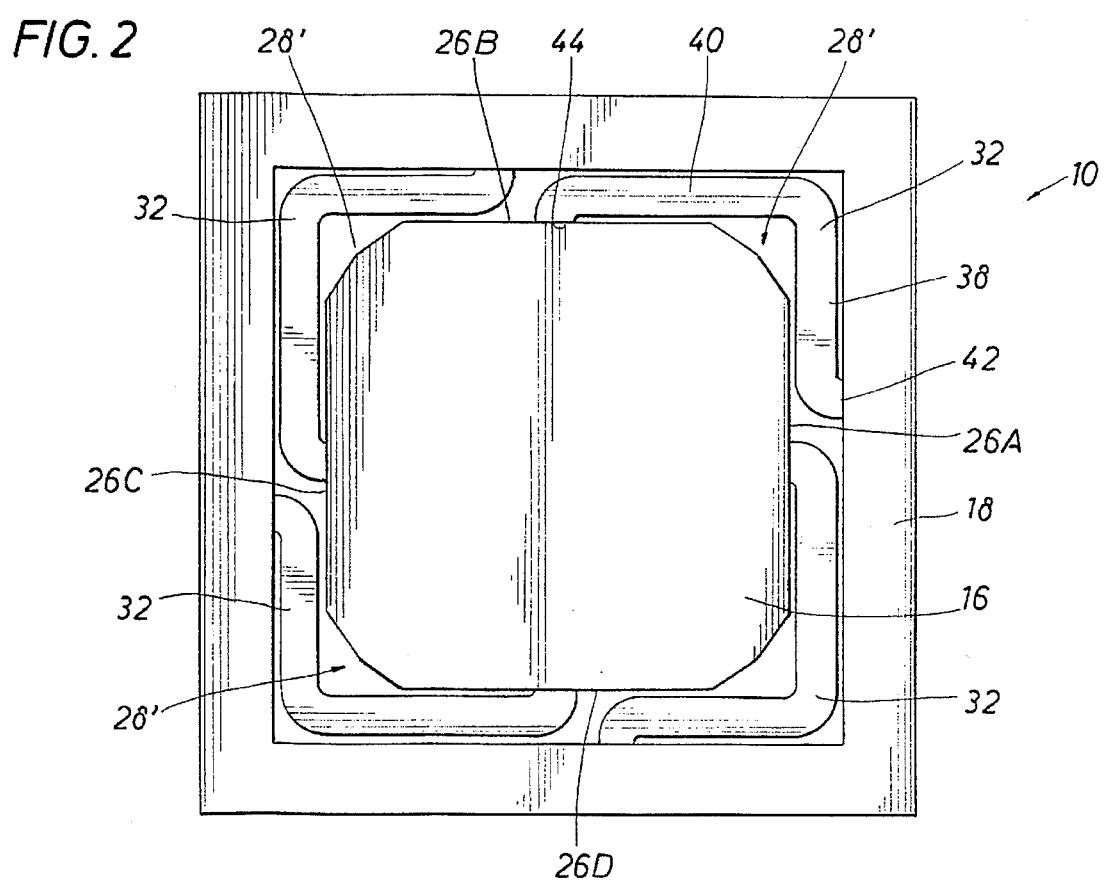
FIG. 2 is a longitudinal sectional view of the center mass, spring and support frame of the sensor assembly shown in FIG. 1.
Figure 3:
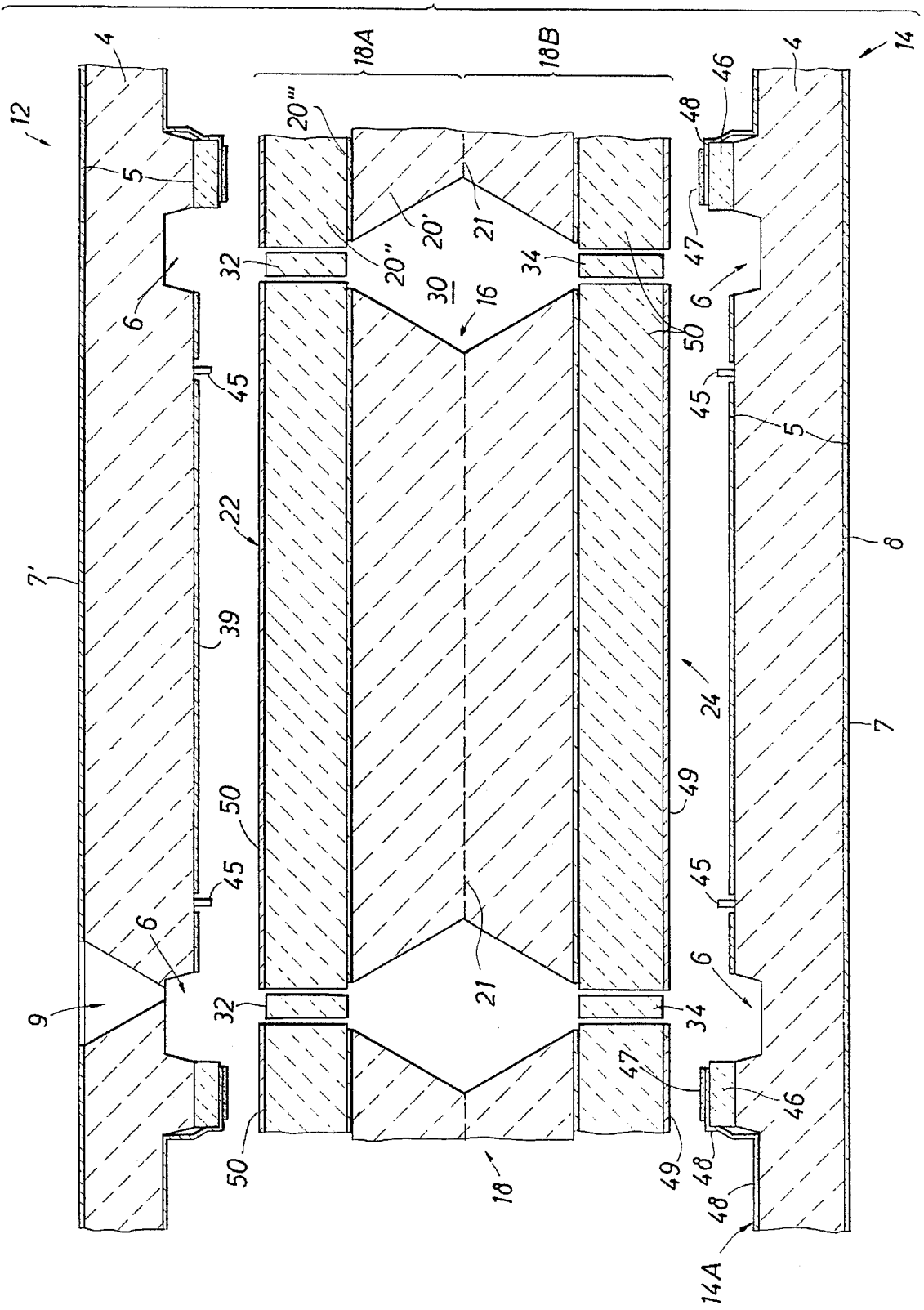
FIG. 3 is a vertical cross section of the sensor assembly.

Referring now to FIGS. 1, 2 and 3 for a better understanding of the invention, a sensor structure for use with electrical circuitry to form an accelerometer, or other motion sensing device is shown generally at 10. Sensor assembly 10 has a body including a top cover (or cap) 12, a bottom cover (or cap) 14, a central (or proof) mass 16 between top cover 12 and bottom cover 14, and a generally rectangular frame 18 receiving such central mass 16 therein between covers 12 and 14. Sensor assembly 10 may be formed from wafers of a nonmetallic monocrystalline material such as silicon, germanium, quartz, gallium arsenide, gallium phosphate, etc. Central mass 16 may have a thickness, of about 1000 microns or smaller. Central mass 16 has an upper surface 22 and a lower surface 24, each of which has sides which are substantially perpendicular to neighboring sides. In other words, the top and bottom surfaces are preferably rectangular or square in shape, but it should be recognized that the corners of such surfaces may be rounded a small amount, as shown in FIG. 2, or even a large amount such that the surfaces are generally circular in shape. The top and bottom surfaces 22, 24, are substantially parallel. The sides 26A, 26B, 26C and 26D of mass 16 between surfaces 22 and 24 are of a concave V-shape and intersect each other at actual corners 28 (FIG. 1) or virtual corners 28' (FIG. 2). Sides 26A–26D have upper and lower edges at respective upper and lower surfaces 22, 24. Mass 16 is spaced at 30 (see FIG. 3) about its entire peripheral surface from adjacent rectangular frame 18 to define an open or void area therebetween.

A spring support structure to support mass 16 from outer frame 18 is provided in the space between mass 16 and frame 18 and includes four upper L-shaped spring members 32 and four superjacent lower L-shaped spring members 34. As indicated in the summary above, the term L-shaped and elbow-shaped are used in the specification to identify the shape of spring members 32 and 34 where the springs have connected perpendicular legs of unequal length. Although the legs are of unequal length, such legs may be of almost the same length where connection to the mass and frame are both near the center line of the mass and the support frame. Spring members 32 and 34 fit about corners 28 of mass 16 with upper spring members 32 connected to the upper edge of mass 16 adjacent upper surface 22 and lower spring members 34 connected to the lower edge of mass 16 adjacent lower surface 24.

Each spring member 32, 34 of each superjacent spring pair is generally identical in shape. As can be seen in FIG. 3, the composite structure including mass 16, springs 32, 34 and frame 18 is fabricated in two halves and joined together. Before joining, that is, when the bottom half of the composite is turned upside down, springs 34 are mirror images of the top springs 32.

Accordingly only one spring member 32 is described in detail, because the remaining spring members 32, 34 are substantially identical. Spring member 32 is an L-shaped, thin, flexible ribbon-like spring which extends about and around a corner 28 or virtual corner 28' of mass 16. As best seen in FIG. 2, the spring member 32 includes a relatively shorter leg 38 and an integral somewhat larger leg 40. Although the preferred embodiment is as shown in FIG. 2, the leg 38 could be designed to be longer than the leg 40. End 42 of leg 38 is secured in a perpendicular direction to end frame 18 intermediate the length of an adjacent side of frame 18. End 44 of leg 40 is preferably secured in a perpendicular direction to side 26B centrally of the length of side 26B as shown particularly in FIG. 2. Upon the action of a force acting in a perpendicular direction to surfaces 22 and 24 of mass 16, top and bottom springs 32 and 34 are displaced or deflected upwardly or downwardly relative to the illustration of FIG. 3. Thus, springs 32, 34 are deformed linearly with input force applied perpendicular to the top and bottom surfaces of mass 16. Such linear movement of the springs enables an extremely accurate measurement of a variable related to such input force by measuring the displacement of mass 16 from its rest position. Such variable may be acceleration or velocity for example.

Mass 16 is restrained by eight springs including four upper springs 32 and four superjacent lower springs 34. Springs 32 and 34 tend to balance each other, and any acceleration moves mass 16 against springs 32, 34. Springs 32, 34 are preferably formed of silicon. The length of each leg and its thickness must be accurately controlled in order to control the spring constant. The L-shape (or elbow-shape) of the springs, with each leg of the L being approximately the same length, contributes to the linearity and durability of the sensor. The preferred method for constructing the rectangular frame and mass structure is by semi-conductor fabrication techniques. The frame 18 and mass 16 are mirror image halves produced by ODE etch techniques. The two halves are bonded together to form the entire mass 16 and support or frame 18 structure. The process for constructing springs 32, 34 of an L-shape so as to connect the mass to the frame is described in copending U.S. patent application Ser. No. 08/218,363 filed Mar. 28, 1994 and entitled Method for Fabricating Suspension Members for Micromachine Sensors which is assigned to the assignee of this application. Such application is incorporated by reference herein for such description as to the preferred manner of fabricating such springs.

Linearity is achieved by design in the preferred embodiment of the invention. Such design provides long spring 32 lengths compared to the distance the mass 16 moves. In the preferred embodiment of the transducer of FIGS. 1, 2 and 3, the length of each spring is about 3000 µm or greater. The distance that the mass 16 moves during measurement of force (acceleration) is about 1 µm or less. Accordingly a high ratio of spring length to the distance that the mass 16 moves is an important design characteristic to achieve linearity. Such ratio should be at least 100, but the sensor may be designed such that the ratio is 3000 or higher. In the preferred embodiment such ratio is 1800 to one.

Other advantageous characteristics of the design also contribute to the high linearity of the spring-mass structure of FIGS. 1–3. The first results from the fact that negligible stress is applied to the L-shaped springs 32, 34 when the proof mass 16 is displaced. This feature results from the fact that the eight L-shaped springs allow the mass 16 to rotate a small angular distance when the mass 16 is displaced. Such rotation relieves tensile stress which is otherwise transmitted to the springs.

The second results from the fact that the L-shaped springs are of the same material as the top and bottom parts of the mass 16 and frame 18. Such uniform materials of spring, mass and frame produces minimum residual stress on the L-shaped springs from processing.

The third results from the balanced structure of having four springs on top and four springs on the bottom connecting the mass 16 to the frame 18.

Vertical travel stops 45 (see FIG. 3) are provided to limit travel of mass 16 relative to end frame 18 so as to prevent electrostatic and mechanical latch-up that may occur when electrodes on mass 16 and complementary electrodes on covers 12, 14 become too close together. Vertical stops 45, which extend from covers 12 and 14, also serve to limit movement of the mass 16 beyond the limits of springs 32, 34 when large vertical shock forces are exerted against mass 16.

Lateral stops (not illustrated) comprising projections could be provided on end frame 18 adjacent springs 32, 34. Such lateral stops would serve to protect the sensor structure from extraordinarily large lateral shock forces. The L-shaped spring design of the invention inherently protects the spring-mass system of structure 10 form lateral shock forces, thereby providing a sensor design, like that shown in FIGS. 1–3, which eliminates the necessity for providing separate lateral stops.

High lateral shock resistance results from the preferred design factors of (1) relatively thick and uniform springs with no sharp breaks in their corners (i.e. rounded corners) are provided (2) no residual stress in the springs result from processing steps (as discussed above), and (3) the balanced design of having eight springs with four springs at the top, four springs at the bottom, one on each corner is provided. Where extremely large lateral shocks are anticipated, lateral stops can be provided.

FIG. 3 illustrates the preferred construction of the spring-mass-frame structure 10 with L-shaped springs 32, 34. The illustration shows the sensor in gravity force balance when a fixed D.C. voltage or a closed loop proof mass position sensing circuit resets the mass to a "zero" position. In other words, the mass does not "sag" on the springs under the influence of the force of gravity. Of course, this embodiment of the invention in a sensor construction does not preclude the invention from being used in a non-gravity force balance embodiment.

The outer frame 18 includes top and bottom portions 18A, 18B. Portion 18A includes a bottom layer 20' of bulk silicon P– material and a top layer 20" of EPI silicon P+ material. A layer 20"' of EPI P++ germanium separates such layers during the production process. Corresponding layers of bottom portion 18B are identical to those described for the top portion 18A of outer frame 18. A silicon fusion bond 21 is shown in dashed lines to indicate that top portion 18A is fused to its mirror image portion 18B to form outer frame 18. The proof mass 16 includes corresponding portions as described for the frame 18. The springs 32, 34 connect the proof mass 16 to the frame 18. Such springs 32, 34 are each L-shaped as seen in FIG. 2.

Top and bottom covers 12, 14 are shown in FIG. 3 in an exploded cross-section view for an entire sensor. Top cover 12 is constructed in identical fashion as cover 14; they are mirror images of each other, except for an electrode connection structure over the bottom cover 14. Accordingly, only the bottom cover 14 is described here.

Cover 14 is fabricated of bulk silicon of P– as indicated by reference number 4. A P+ diffusion layer 5 may be provided where necessary to prevent Schotky diode effects. Notches 6 are provided to correspond to the position of springs 34 of the frame 18-spring 34-proof mass 16 system above. A metal layer 7 is provided on the bottom cover to provide a bottom electrode contact for the sensor. A layer of metal 7' is provided on the top cover 14 to provide a top electrode contact for the sensor. Vertical travel stops 45 and vertical extensions 46 are formed of silicon dioxide.

A layer of metal 48 is provided about the top surface of exterior 14A of cover 14 (alternatively, extension 14A may be provided with top cover 12 where a four terminal sensor is desired). Such metal 48 extends to the top surface of extension 46. A layer of metal 49 is provided on the bottom surface of frame 18 and proof mass 16. The cover 14 is bonded to the frame 18 by providing a solder layer 47 between metal layers 48 and 49. In a corresponding manner, top cover 12 is bonded to the top metal layer 50 of frame 18.

A vent 9 is provided in top cover 12 (or alternatively in bottom cover 14) to produce a vacuum within the top and bottom covers so as to prevent air molecules or contaminants from interfering with the movement of mass 16 with respect to frame 18 and with respect to top and bottom covers 12, 14. According to the preferred embodiment of a sensor according to the invention vent 9 is not plugged, because a package surrounding the sensor of FIGS. 1–3 may be provided to envelope the sensor, thereby preventing air from invading the spaces between covers 12, 14 and the frame 18-springs 32-mass 16. Vent 9 may be plugged after a vacuum is produced, where an enveloping package is not provided. Metal may be deposited on the springs 34 so as to form a conductive path from the electrode at 14A to the frame 18 to the metallic surface 49 of mass 16.

As an example of the use of the sensor structure in an accelerometer arrangement, FIG. 4 shows one preferred embodiment of the invention with force conducting areas 46 formed on opposed surfaces or faces 22, 24 of mass 16. Sense conducting areas 48 on faces 22, 24 surround force conducting areas 46. Areas 46 and 48 are conductively isolated from each other with suitable insulating guards. Corresponding force and sense conducting areas 46A and 48A are formed on adjacent top and bottom plates or covers 12, 14. Lead 55 connects force conducting areas 46 on opposed faces 22, 24 of mass 16. A D.C. voltage V1 is applied between sense conducting areas 48A of opposed plates 12, 14 and is of a predetermined magnitude. Leads 56 are connected to top and bottom sense conducting areas 48 of mass 16 and extend to a differential amplifier 58 via input lead 60.

Differential amplifier 58 has another input lead 62 connected to a D.C. voltage V2 of a predetermined magnitude. The voltage appearing on lead 60 is proportional to the position of mass 16 between upper and lower plates 12 and 14, because sense conducting areas 48 of mass 16 are disposed in the path of the sense electric field caused by voltage V1 applied to sense conducting areas 48A. When mass 16 moves toward the area 48A of upper plate 12, the voltage on sense area 48 and lead 60 approaches the magnitude of reference voltage V1; and conversely, when mass 16 moves toward lower plate 14, the voltage on sense area 48 of lower face 24 approaches zero or ground magnitude. A D.C. voltage V3 of a predetermined magnitude is connected to force conducting area 46A on upper plate 12. Voltage V3 may be of the same magnitude as voltage V1 or may be different.

A reference D.C. voltage V2 of a predetermined magnitude is applied via lead 62 to amplifier 58. As a result, the output signal on lead 64, which is applied to filter 66, is a sense displacement signal proportional to the distance that mass 16 has moved from a reference position. The displacement signal on lead 64 is filtered by filter 66 and results in an output signal from lead 68.

Voltage V3 applied between force conducting areas 46A on upper and lower plates 12, 14 creates a force electric field across force conducting areas 46 of mass 16. A negative feedback circuit is illustrated by charge generator 70 which produces an output signal on its output lead 72 in response to the output displacement signal from lead 74 to apply an amount and magnitude of electric charge on force conducting areas 46 to move mass 16 toward its reference position, normally halfway between upper and lower plates 12, 14. Such a charge generator circuit is disclosed in the before-mentioned U.S. Pat. No. 4,922,756 to Henrion, which is incorporated by reference herein.

Thus, the force or acceleration applied to sensor 10 causes displacement of mass 16 from distortion of springs 32 and 34. Displacement of mass 16 from a reference position is sensed as a displacement signal which causes charge generator 70 to generate a charge which is applied to force conducting areas 46 to return mass 16 to its reference position. Displacement of mass 16 is directly proportional to acceleration. Thus, the output signal from lead 68 is an analog signal proportional to acceleration for acceleration frequencies below the effective resonant frequency of sensor or transducer 10. The output signal may be received at a remote location for measurement and conversion to a suitable digital signal as is well known.

Other circuits and methods may be provided for measuring the acceleration (or other characteristic such as velocity) of sensor 10 such as an accelerometer similar to that of FIG. 4, but utilizing an alternating voltage applied between sense conducting areas and force conducting areas. For further details of suitable arrangements for measuring acceleration with a frame-spring-mass structure, reference may be made to U.S. Pat. No. 4,922,756 to Henrion, the entire disclosure of which is incorporated herein.

An alternative preferred embodiment of an accelerometer is similar to that of FIG. 4, but where only one conducting surface is applied to each of the top and bottom surfaces of mass 16 and the facing surfaces of covers 12, 14. Sense signals are received from the top and bottom surfaces 22, 24 of mass 16 and force signals are applied to such top and bottom surfaces 22, 24 separated in time, by multiplexing. Furthermore, filter 66 of the forward loop illustrated in FIG. 4 may include an integrator such that a sigma-delta modulation system is provided as discussed in the above mentioned Henrion patent, incorporated herein.

The L-shaped springs 32, 84 support mass 16 within support frame 18 in a spring balanced configuration with a high degree of mechanical symmetry, because springs 32, 34 are connected to mass 16 centrally of the length of mass sides 26A, 26B, 26C and 26D. As a result of such mechanical symmetry, the effects of undesired off-axis and rotational forces are minimized. Mass 16 may be formed of two layers or wafers back-to-back with four springs on each of the layers. Mechanical lateral stops may be provided to limit lateral movement of springs 32, 34, mass 16 and to protect springs 32, 34 beyond their limits which could cause possible damage. Travel stop posts 45 may be provided on outer plates 12, 14 to limit movement of mass 16 in a direction perpendicular to the upper and lower surfaces of mass 16. Thus, sensor 10 will tolerate shock forces over 1000 g's without any damage.

Although it is preferred to connect the ends of the springs to the center point of the top and bottom surfaces 22, 24 of mass 16, for the reasons described above, the springs 32, 34 may be connected off such center point, even toward the ends of the sides of the top and bottom surfaces 22, 24. Accordingly, for such design, the springs will have legs of greater unequal length than for the preferred embodiment where the spring legs are of almost equal length.

It now will be recognized that a new and improved sensor structure has been disclosed which meets all of the objectives of the present invention, and which incorporates numerous unique features and advantages as set forth herein. Since certain changes or modifications may be made in the disclosed embodiment without departing from the inventive concepts involved, it is the aim of the appended claims to cover all such changes and modifications falling within the true spirit and scope of the present invention.

What is claimed is:

1. A sensor structure comprising
    a support frame (18) having a cavity defined by adjacent inwardly facing sides which join each other at inwardly facing junctures,
    a mass (16) disposed within said cavity, said mass having outwardly facing sides which intersect each other at outwardly facing junctures such that each of said outwardly facing sides of said mass is parallel and corresponds to one of said inwardly facing sides of said support frame, and
    each of said junctures of said outwardly facing sides of said mass (16) faces and corresponds to one of said inwardly facing junctures of said support frame (18);
    said mass being dimensioned and arranged in said cavity so as to produce a peripheral space defined between said outwardly facing sides of said mass and said inwardly facing sides of the support frame; and
    a plurality of springs (32) with each of said springs having only two connection ends, each of said springs having a first leg having a first connection end of said two connection ends and a second end, each of said spring having a second leg having a first end and a second connection end of said two connection ends, said first leg being disposed at an angle with respect to said second leg and having said second end joined to said first end of said second leg at a junction of a junction region where said second end of said first leg joins with said first end of said second leg, said junction region being characterized by an elbow shape, each of said springs placed in said peripheral space and (i) is connected at said first (44) end of said two connection ends to one of said outwardly facing sides of said mass (16), (ii) has said junction region placed around one of said outwardly facing junctures of two of said outwardly facing sides of said mass, and (iii) connects at said second connection end (42) to one of said inwardly facing sides of said support frame, the springs for mounting said mass for movement relative to said support frame.

2. The structure of claim 1 wherein:
    four L-shaped springs connect a top portion of said outwardly facing sides of said mass to a top portion of said inwardly facing sides of said support frame and four additional L-shaped springs connect a bottom portion of said outwardly facing sides of said mass to a bottom portion of said inwardly facing sides of said support frame.

3. The structure of claim 2 wherein:

mass displacement distance is a distance that said mass moves within said cavity while suspended from said support frame by said plurality of springs, and each of said four L-shaped springs which connect a top portion of said outwardly facing sides of said mass to a top portion of said inwardly facing sides of said support frame and each of said four additional L-shaped springs which connect a bottom portion of said outwardly facing sides of said mass to a bottom portion of said inwardly facing sides of said support frame are designed and arranged to have substantially longer length than said mass displacement distance, such that a ratio of spring length to mass displacement distance is at least 100 to 1.

4. The structure of claim 3 wherein:

each of said L-shaped springs is substantially the same length as all other springs, and said ratio of spring length to mass displacement distance is about 1800 to 1.

5. The structure of claim 2 wherein:

said four L-shaped springs which connect said top portion of said mass to said support frame are identical in shape to said four additional L-shaped springs which connect said bottom portion of said mass to said support frame.

6. The structure of claim 2 wherein:

said four L-shaped springs are fabricated of substantial identical material as said top and bottom portions of said outwardly facing sides of said mass and said top and bottom portions of said inwardly facing sides of said support frame.

7. A sensor structure including:

an outer support frame including four frame members each of which is perpendicular to two other of said four frame members, said frame members forming a central opening where each of said four frame members has a side which faces inwardly toward said central opening, a moveable mass disposed within said central opening and including four mass sides, each of said mass sides facing outwardly and being perpendicular to two other of said four mass sides, said moveable mass being designed and dimensioned to fit within said central opening so that four side spaces are defined, each of said side spaces defined between each side of said mass sides and a corresponding frame member side which is parallel to each respective side of said mass, each of said four side spaces forming a juncture space with another side space at a location outwardly of an intersection of two mass sides of said four mass sides and inwardly of an innersection of two frame member sides of said four frame members, four L-shaped springs, each said spring having first and second spring ends, each said L-shaped spring being connected only at said first spring end to a support frame member side of said four frame members and is connected at said second spring end only to a mass side of said four mass sides which is perpendicular to said support frame member side to which said first spring end is connected, each said L-shaped spring including a first leg joined to a second leg at a spring leg junction at a position where said first leg of said spring is joined to a second leg of said spring, with each said L-shaped spring having said first leg positioned within a first side space of said four side spaces with said second leg positioned within a second side space of said four side spaces which is perpendicular to said first side space, and with said spring leg junction of each said L-shaped spring being positioned in said juncture space outwardly of an intersection of said first and second side spaces.

8. The sensor structure as set forth in claim 7 wherein:

a pair of spaced superjacent springs are mounted about each said juncture space of said sides of said mass, each of said superjacent springs having one leg connected to a side of said mass and another leg connected to a side of said outer support frame.

9. The sensor structure as set forth in claim 8 wherein:

said moveable mass and said outer support frame include top and bottom surfaces, and each of said superjacent springs comprises a thin flexible spring constructed of material which is substantially the same as that of said top and bottom surfaces of said moveable mass and said outer support frame.

10. The sensor structure as set forth in claim 9 wherein:

each of said superjacent springs includes one leg connected to one of said sides of said mass substantially in the middle of the length of said one side of said mass and the other leg is connected to one of said support frame sides which is perpendicular to said one side of said mass.

11. The sensor structure of claim 7 further comprising top and bottom cover plates fixed to said frame, said plates respectively facing said top and bottom surfaces of said mass; and vertical stop members extending downwardly from said top plate and upwardly from said bottom plate for contacting said top and bottom surfaces to prevent excessive vertical movement of said mass with respect to said support frame so as to prevent electrostatic latch up and overtravel of said mass.

12. The structure of claim 7:

wherein said mass has top and bottom surfaces with four sides; and wherein each said L-shaped spring has first and second legs with said second leg connected to a mass side in the middle part of said top or said bottom surface of said mass and has said first leg connected approximately at the middle part of a frame member side which is perpendicular to said top or said bottom surface of said mass to which said second leg is attached.

13. The sensor structure of claim 12 wherein:

four L-shaped springs connect a top side of said mass to said support frame and four L-shaped springs connect a bottom side of said mass to said support frame.

14. The sensor structure of claim 7 wherein:

a pair of superjacent generally L-shaped springs are disposed about each said juncture space of said mass.

15. The sensor structure as set forth in claim 14 wherein:

each of said pair of L-shaped springs is identical in shape and the mirror image of the other spring of said pair of springs, when viewed from the top or the bottom of said sensor structure.

16. The sensor structure as set forth in claim 7 further comprising:

upper and lower cover plates mounted on said support frame in spaced adjacent relation to said mass.

17. The structure of claim 7 wherein:

four top L-shaped springs connect a top side of said mass to a top side of said support frame and four bottom L-shaped springs connect a bottom side of said mass to a bottom side of said support frame.

18. The structure of claim 17 wherein:

said four top L-shaped springs and said four bottom L-shaped springs are designed and arranged to have substantially longer length than the displacement distance of said mass which is suspended by said springs from said support frame, such that a ratio of spring length to mass displacement distance is at least 100 to 1, wherein mass displacement distance is the distance that said mass moves with respect to said support frame in a perpendicular direction to said top side and said bottom side of said mass.

19. The structure of claim 18 wherein:

said ratio of spring length to mass displacement distance is about 1800 to 1.

20. The structure of claim 17 wherein:

said four L-shaped springs which connect a top side of said mass to said support frame are identical in shape to said four L-shaped springs which connect said bottom side of said mass to said support frame, whereby said mass may rotate a small angular distance when said mass is displaced, thereby contributing to the high linearity of said sensor structure.

21. The structure of claim 17 wherein:

said four top springs and four bottom springs are fabricated of substantially identical material as said top and bottom sides of said mass and said top and bottom sides of said support frame, thereby contributing to the high linearity of said sensor structure.

22. A sensor structure comprising a frame, a moveable mass, four L-shaped springs which include a first leg joined to a second leg at a juncture region, where said first leg of each said L-shaped spring is connected only to said frame but not to said mass and said second leg of said each said L-shaped spring is connected only to said mass but not to said frame, and said juncture region of each of said L-shaped springs is positioned in a juncture space formed between the frame and the mass.

* * * * *